(12) United States Patent  
Procknow et al.

(10) Patent No.: US 7,373,956 B2
(45) Date of Patent: May 20, 2008

(54) PASSAGEWAY HAVING NON-LINEAR FLOW PATH

(75) Inventors: Dave Procknow, Elm Grove, WI (US); John Garthwaite, Sussex, WI (US); Gary Gracyalny, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 10/779,363

(22) Filed: Feb. 13, 2004

(65) Prior Publication Data

US 2005/0178352 A1   Aug. 18, 2005

(51) Int. Cl.
*F15D 1/02* (2006.01)

(52) U.S. Cl. .................. 138/39; 138/109; 138/DIG. 11; 123/280; 123/262; 123/184.21

(58) Field of Classification Search .............. 138/39, 138/109, DIG. 11; 123/280, 262, 184.56, 123/184.61, 184.53, 184.21
See application file for complete search history.

(56) References Cited

U.S. PATENT DOCUMENTS

| | | | | |
|---|---|---|---|---|
| 1,300,015 A | * | 4/1919 | Reed | 48/189.4 |
| 1,333,142 A | * | 3/1920 | Ulmer | 138/37 |
| 3,422,805 A | * | 1/1969 | Dzianott | 123/188.14 |
| 3,630,229 A | * | 12/1971 | Nagel et al. | 137/625.3 |
| 4,159,073 A | * | 6/1979 | Liller | 228/125 |
| 4,302,935 A | * | 12/1981 | Cousimano | 60/272 |
| 5,113,838 A | * | 5/1992 | Kim | 123/592 |
| 5,642,697 A | | 7/1997 | Jahrens et al. | |
| 5,765,372 A | | 6/1998 | Mitobe et al. | |
| 5,992,465 A | * | 11/1999 | Jansen | 138/37 |
| 6,089,320 A | * | 7/2000 | LaGrange | 166/313 |
| 6,439,267 B2 | * | 8/2002 | Welker | 138/39 |
| 6,450,141 B1 | | 9/2002 | Sakuma | |
| 6,460,502 B2 | | 10/2002 | Gracyalny | |
| 6,701,964 B1 | * | 3/2004 | Maurice | 138/39 |
| 2002/0050260 A1 | | 5/2002 | Harvey | |
| 2002/0050261 A1 | | 5/2002 | Miyahara et al. | |
| 2002/0073961 A1 | | 6/2002 | Tanaka et al. | |
| 2002/0124826 A1 | | 9/2002 | Corduan et al. | |
| 2003/0019456 A1 | | 1/2003 | Ayton | |
| 2003/0029408 A1 | | 2/2003 | Kallander | |

FOREIGN PATENT DOCUMENTS

| | | |
|---|---|---|
| DE | 196 36 579 A1 | 3/1997 |
| EP | 0 508 188 A | 10/1992 |
| EP | 1424490 A1 | 2/2004 |
| JP | 59 096426 | 6/1984 |
| JP | 06 330827 A | 11/1994 |
| WO | WO 03/014557 A | 2/2003 |

* cited by examiner

*Primary Examiner*—James Hook
(74) *Attorney, Agent, or Firm*—Michael Best & Friedrich, LLP

(57) ABSTRACT

A tube for directing fluid along a path that includes a bend. The tube comprising a conduit having a first aperture, a second aperture, and a bend portion adjacent the second aperture. An outer bend surface is integrally formed as part of the conduit to at least partially define the second aperture. An insert includes at least a portion of an inner bend surface and is disposed at least partially within the second aperture such that the outer bend surface and the inner bend surface cooperate to at least partially define the bend.

24 Claims, 7 Drawing Sheets

PASSAGEWAY HAVING NON-LINEAR FLOW PATH

BACKGROUND

The present invention relates generally to internal combustion engines. More particularly, the present invention relates to manifolds or other passageways for directing fluids within internal combustion engines.

Internal combustion engines are commonly used to provide power for lawn care and gardening implements such as rototillers, lawnmowers, edgers, and the like. These internal combustion engines generally include a carburetor that feeds an air/fuel mixture to one or more cylinders.

It is sometimes desirable to position the carburetor or other air/fuel mixing device on one side of the engine, while the cylinder intake valve(s) is located on the opposite side. In this type of arrangement, an intake crossover manifold or tube is employed to provide a flow path for the air/fuel mixture. To provide the best air/fuel mixture by reducing turbulent fluid flow, it is desirable to provide the smoothest flow path possible between the carburetor and the cylinder intake. Thus, straight tubes or tubes with smooth bends are preferred over typical tubes with relatively sharp or small inner radius bends.

Some prior art tubes were manufactured out of metal. These metal tubes were typically manufactured from two separate pieces. Specifically, a tube portion attached to a die cast portion. However, these tubes included a sharp inner radius and were relatively expensive to manufacture.

Other tubes were manufactured from thermoplastic materials. However, the high temperatures generated by the engine can soften the thermoplastic. This softening necessitates the use of more rigid tubes that include shoulder inserts, stiffening ribs, or other stiffening features. In addition, an o-ring or gasket must be used to assure a seal and to thermally insulate the tube from the hottest engine components. Other items, such as metal threaded inserts may also be required, thereby increasing the cost of thermoplastic tubes. These additional costs increase the cost of the engine.

Tubes having the desired inner radius can be manufactured using multi-piece or rotating cores. However, the methods of manufacture used are costly. In addition, the thermoset plastic tends to cause wear and sticking problems when used in conjunction with rotating cores. This makes it difficult to form a smooth-walled part including the desired inner radius using thermoset plastics.

FIG. 1 illustrates one prior art tube 1 in section. As can be seen, the inner corner of the tube 2 is not radiused. This sharp corner creates turbulence and other flow losses that are undesirable.

SUMMARY

The present invention provides a manifold or tube for directing fluid along a path that includes a bend. The tube includes a conduit having a first aperture, a second aperture, and a bend portion adjacent the second aperture. An outer bend surface is integrally formed as part of the conduit to at least partially define the second aperture. An insert includes at least a portion of an inner bend surface and is disposed at least partially within the second aperture such that the outer bend surface and the inner bend surface cooperate to at least partially define the bend.

In another aspect, the invention provides an engine comprising an engine housing defining a combustion chamber. A carburetor or other air/fuel mixing device such as a throttle body is operable to mix a flow of fuel with a flow of air to produce an air-fuel mixture and a piston is reciprocal within the combustion chamber in response to the combustion of the air-fuel mixture. An intake crossover tube is positioned to receive the air/fuel mixture from the carburetor and deliver the air/fuel mixture to the combustion chamber generally via an intake port and valve. The intake crossover tube includes a conduit having a first aperture, a second aperture, and a bend portion adjacent the second aperture. An outer bend surface is integrally formed as part of the conduit to at least partially define the second aperture. The invention also includes an insert having an inner bend surface. The insert cooperates with the outer bend surface to at least partially define the second aperture.

In still another aspect, the present invention provides a method of manufacturing an intake crossover tube that defines a flow path having a bend. The method includes providing a mold that includes a first cavity shaped to form a conduit having an aperture at least partially defined by an outer curved surface of the bend. The mold may also includes a second cavity shaped to form an insert defining an inner curved surface of the bend. The method also includes filling the mold cavities with a plastic to form the insert and the conduit and positioning the insert within the aperture such that the inner curved surface and the outer curved surface cooperate to at least partially define the bend. Thus, both parts are formed in the same two-cavity "family" mold so that the additional cost of the insert is nominal, amounting to little more than the cost of the additional plastic.

Additional features and advantages will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 2:
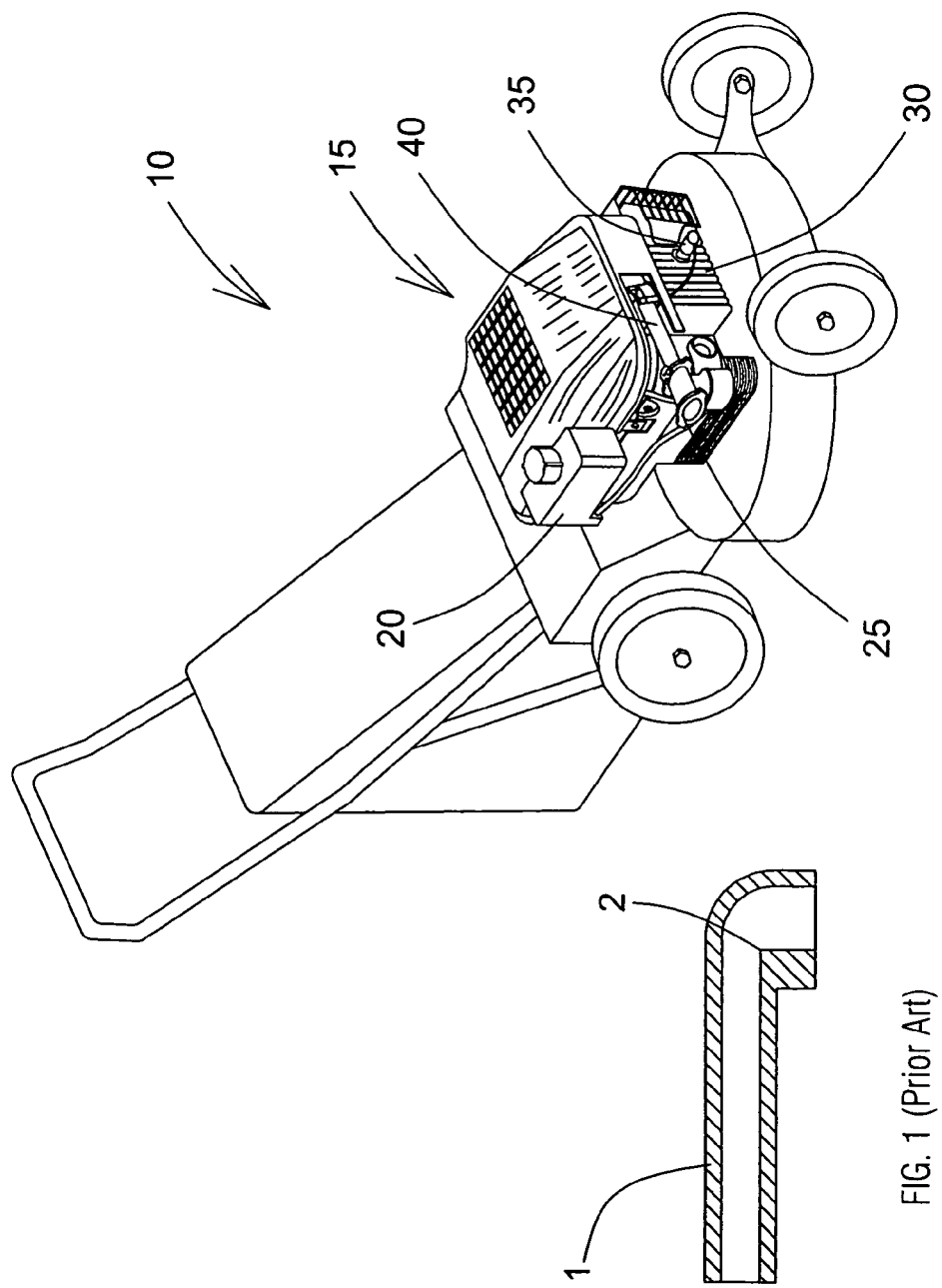
FIG. 2 is a perspective view of a lawn mower including an engine.
Figure 1:
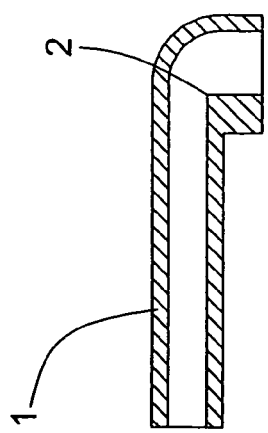
FIG. 1 is a sectional view of a prior art inlet crossover tube.

With reference to FIG. 2, a yard implement in the form of a lawn mower 10 is illustrated. The lawn mower 10 includes an engine 15 positioned to drive a rotating blade that cuts the grass beneath the lawn mower 10. Engines 15 of the type used to power the lawn mower 10 are also suited to power other types of outdoor power equipment (e.g., rototillers, power augers, edgers, log-splitters, string-trimmers, chipper/ shredders, snow throwers, pressure washers, and generators).

Figure 3:
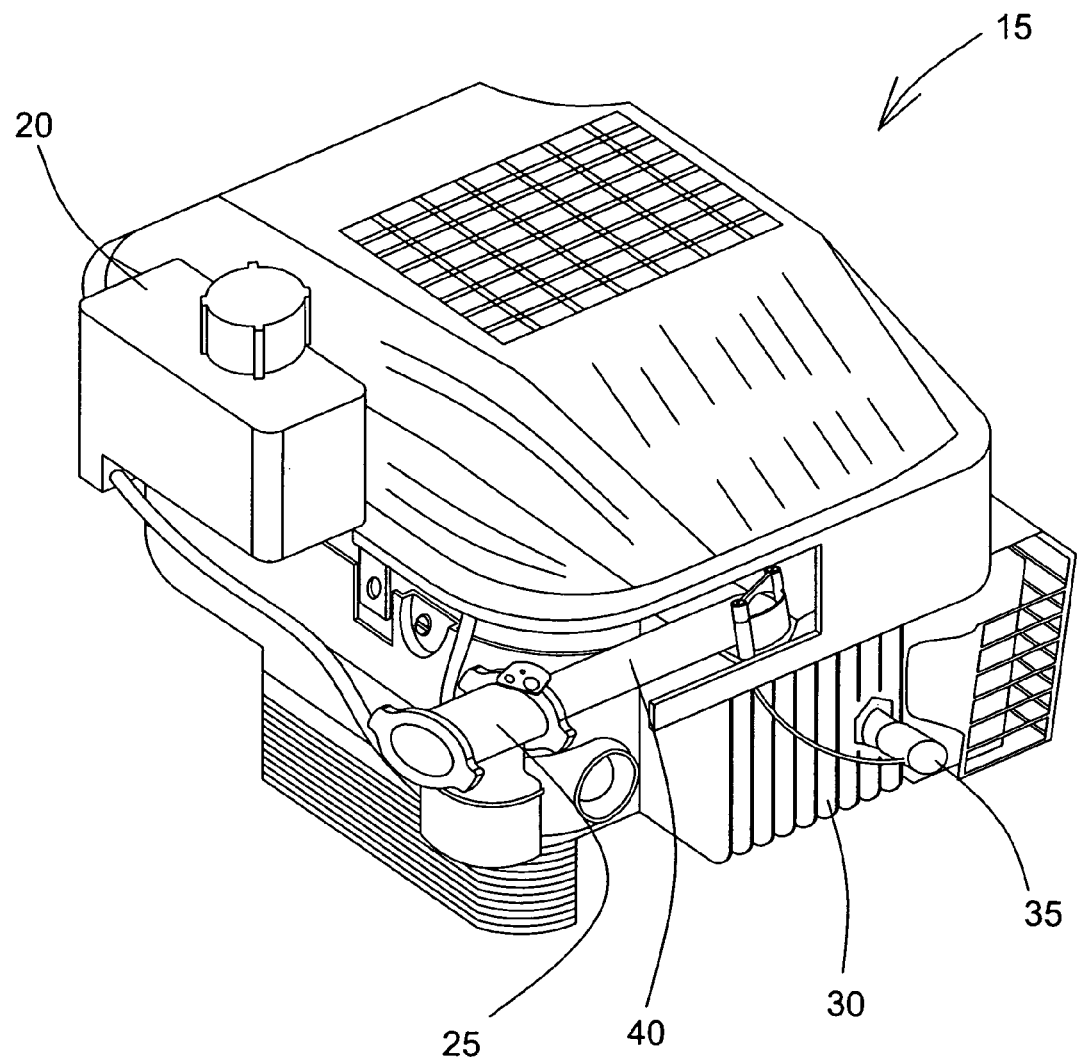
FIG. 3 is a perspective view of the engine of FIG. 2 including an intake crossover tube.

One such engine 15, illustrated in FIG. 3, incldes a fuel tank 20, a carburetor 25, a cylinder 30, a spark plug 35, and an intake crossover tube 40. Fuel and air mix in the carburetor 25 and flow to the cylinder 30 through a flow path 45 at least partially defined within the crossover tube 40. As one of ordinary skill will realize, other components or features, such as an intake port and a valve, are generally disposed between the crossover tube 40 and the cylinder 30. Thus, while the crossover tube 40 is described herein as directing air or an air/fuel mixture to a cylinder or a combustion chamber, it should be understood that other components or features may be positioned between the crossover tube and the cylinder or combustion chamber. The spark plug 35 ignites the air/fuel mixture within a combustion chamber disposed within the cylinder 30 to produce usable power. To better isolate the carburetor from the exhaust heat, it is desirable to arrange the engine components such that the carburetor 25 is on the opposite side of the cylinder head from the exhaust muffler. This arrangement requires that the tube 40 make a right-angle bend to direct the air-fuel mixture to the desired location. It should be understood that other engine arrangements may necessitate longer or shorter intake crossover tubes. In addition, other engines may require a bend at an angle other than ninety-degrees or may require multiple bends. Still other engines may use multiple tubes, or a single component (manifold) having multiple flow paths that are arranged to direct the air/fuel mixture to multiple cylinders. As such, the intake crossover tube 40 described herein is only an example of one such tube that is suited to the particular engine 15 illustrated in FIG. 3. In addition, other applications may use a tube similar to the one described herein. For example, a tube similar to that described herein could be used to carry engine coolant in a water-cooled or liquid-cooled engine.

It should also be noted that while a spark-ignition internal combustion engine having a combustion chamber is described herein, the present invention is also well suited to use with other engines such as diesel engines that also provide for combustion within an enclosed combustion chamber but without the use of a spark. The crossover tube 40 may be used in diesel and fuel injected engines to provide air alone to the intake port.

The intake crossover tube 40, better illustrated in FIGS. 4-6, and 8 includes a tube outlet 50 oriented at an angle of substantially ninety degrees relative to a crossover tube inlet 55. As such, the flow path 45 makes a ninety-degree bend to direct the air/fuel mixture from the inlet 55 to the outlet 50. While a smooth ninety-degree bend is not necessary for engine function, a smooth flow path 45 and ninety-degree bend can reduce turbulent flow of the air/fuel mixture between the carburetor 25 and the cylinder intake, thereby improving engine operation.

Figure 4:
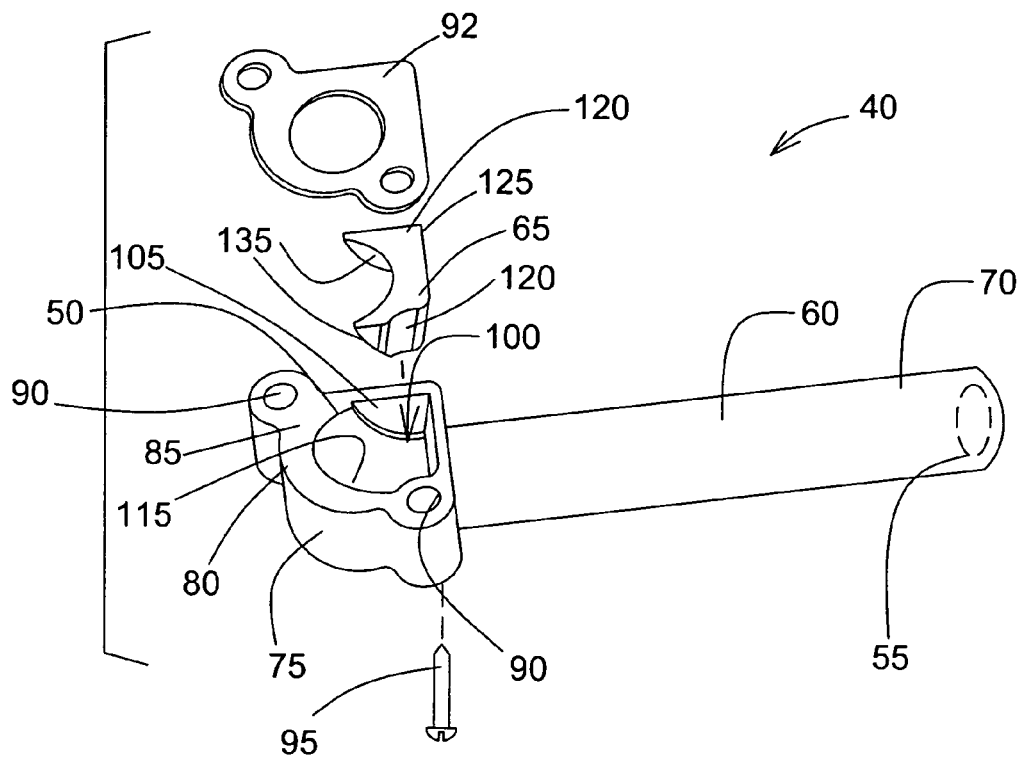
FIG. 4 is an exploded perspective view of the intake crossover tube of FIG. 3.
Figure 5:
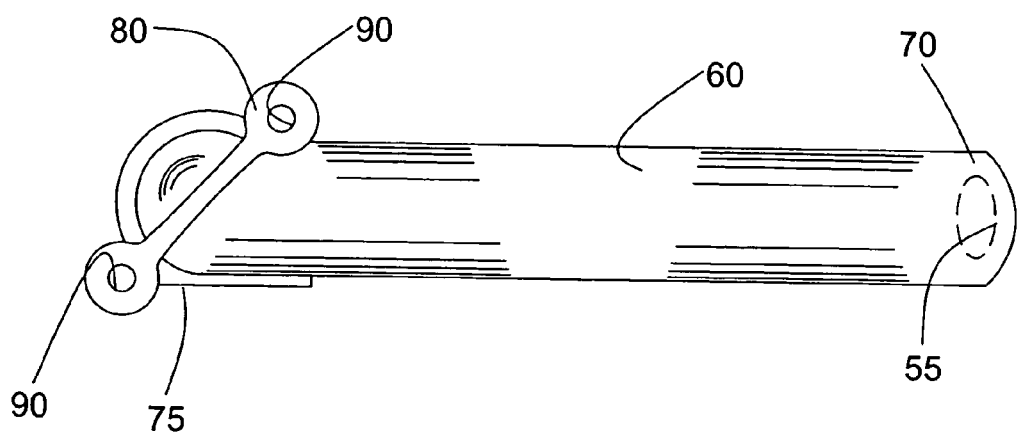
FIG. 5 is a rear view of the intake crossover tube of FIG. 3.
Figure 6:
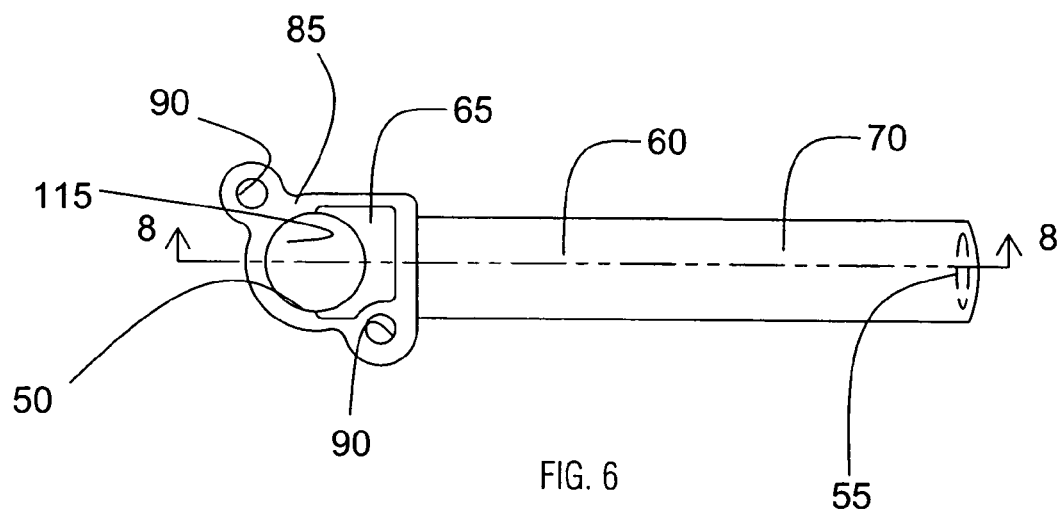
FIG. 6 is a front view of the intake crossover tube of FIG. 3.

Turning to FIG. 4, an exploded view of the intake crossover tube 40 is illustrated. The intake crossover tube 40 includes a tube or conduit portion 60 and an insert 65. The conduit portion 60 defines a substantial portion of the intake crossover tube 40. The conduit portion 60 includes an inlet end 70 that is substantially tubular and defines the tube inlet 55. The tube inlet 55 is in fluid flow communication with the carburetor 25 to receive the air-fuel mixture for delivery to the cylinder 30 or cylinders. The inlet end 70 may include a flange that attaches to the carburetor 25 to provide a seal, or may be straight as illustrated herein. The straight inlet end 70 fits within an opening and is surrounded by a soft gasket (e.g., rubber) that provides a seal between the carburetor 25 and the conduit portion 60.

The conduit portion 60 also includes an outlet end 75 that defines an attachment flange 80. The attachment flange 80 includes a substantially planar flange surface 85 and two fastener holes 90. The flange surface 85 engages a flat attachment surface adjacent the cylinder 30 to fixedly attach the intake crossover tube 40 to the cylinder 30. In some constructions, a gasket, O-ring, or the like is positioned between the flange surface 85 and the attachment surface to provide an air tight seal that is adequate for proper engine operation. The gasket can be attached to the flange surface 85, or could simply be sandwiched between the flange surface 85 and the cylinder 30. Two fasteners 95 (e.g., bolts, screws, studs, self-tapping screws, and the like) pass through the fastener holes 90 and complete the attachment of the intake crossover tube 40 to the cylinder 30.

The outlet end 75 also includes a pocket or outlet opening 100 at least partially defined by two recessed locating surfaces 105 formed as part of the conduit 60 (one shown). The recessed surfaces 105 are shaped to engage the insert 65 when it is positioned within the outlet opening 100 of the conduit portion 60. Once inserted, the pocket inhibits movement of the insert 65 in all directions except away from and normal to the flange surface 85. The gasket 92 engages the flange surface 85 to provide a seal between the intake crossover tube 40 and the cylinder 30. In addition, the gasket 92 retains the insert 65 and inhibits movement in the direction normal to the flange surface 85. Due to the proximity of the gasket to the hot engine components, a high-temperature material (e.g., soft metal, ceramic, garlock, nylon, rubber, and the like) should be used.

In another construction, a high-temperature adhesive is used to inhibit movement of the insert 65 away from and normal to the flange surface 85. Adhesive can be applied to any surfaces that contact the conduit portion 60 to achieve adhesion of the insert 65 to the conduit portion 60.

Figure 8:
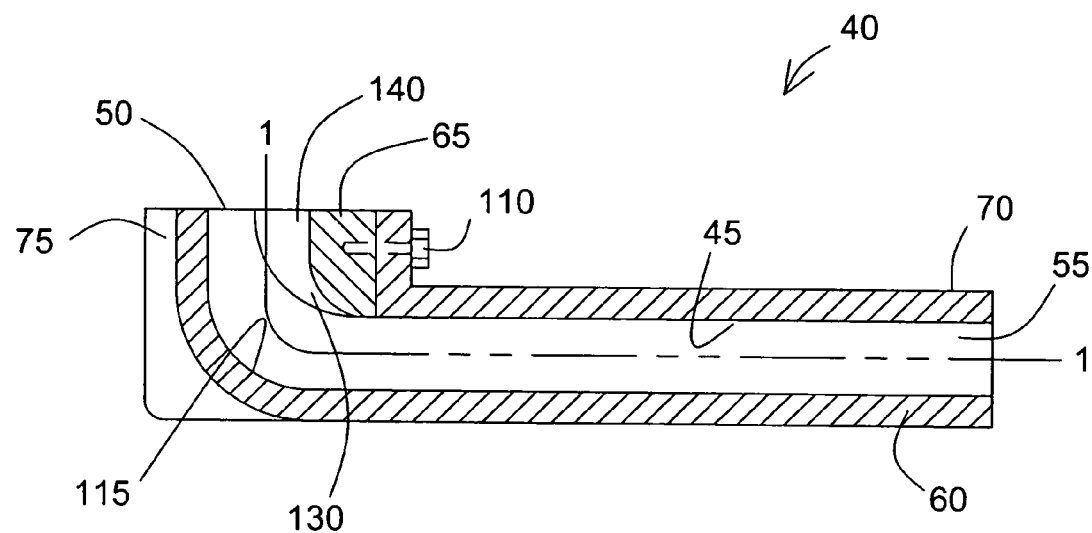
FIG. 8 is a sectional view of the tube taken along line 8-8 of FIG. 6.

FIG. 8 illustrates another construction that employs a fastener 110 to attach the insert 65 to the conduit 60. The fastener 110 passes through the conduit portion 60 to engage and fixedly attach the insert 65. Other constructions may use other fasteners or more than one fastener to attach the insert 65 to the conduit 110. For example, another construction employs two fasteners that pass through the recessed surfaces 105 to engage the insert 65.

Figure 12:
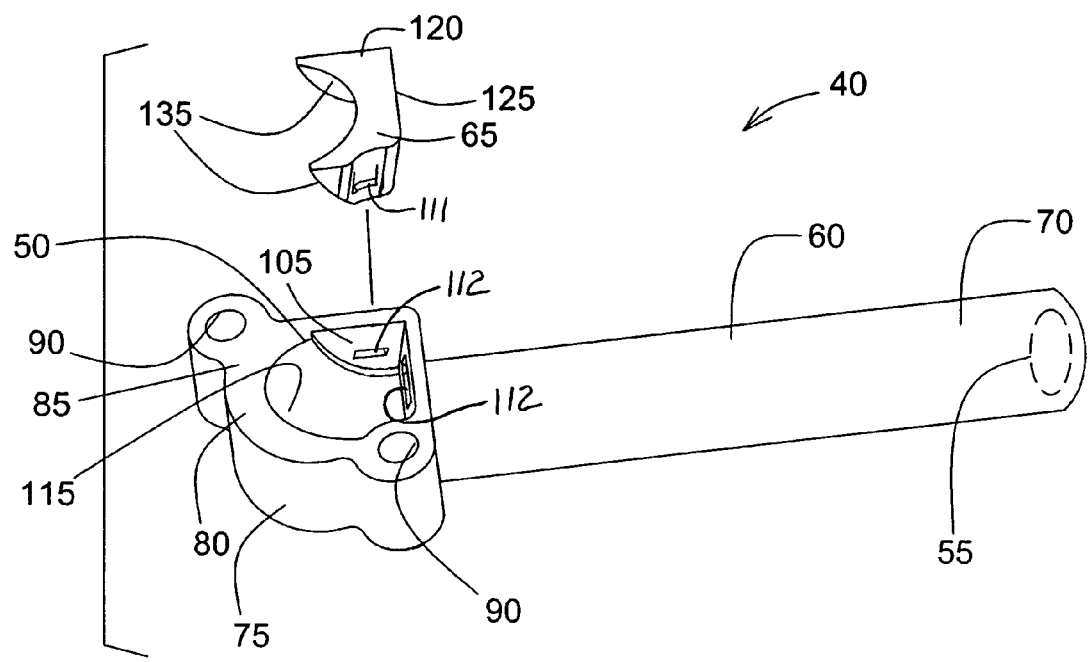
FIG. 12 is an exploded perspective view of a crossover tube including a snap-fit arrangement.

In still other constructions, the insert 65 engages the conduit portion 60 using a snap-fit (shown in FIG. 12). The insert 65 includes a male portion 111, while the conduit 60 includes a female portion 112 that engages the male portion 111 to lock the insert 65 and the conduit 60 together. Of course, other constructions reverse the locations of the male member 111 and the female member 112.

Figure 11:
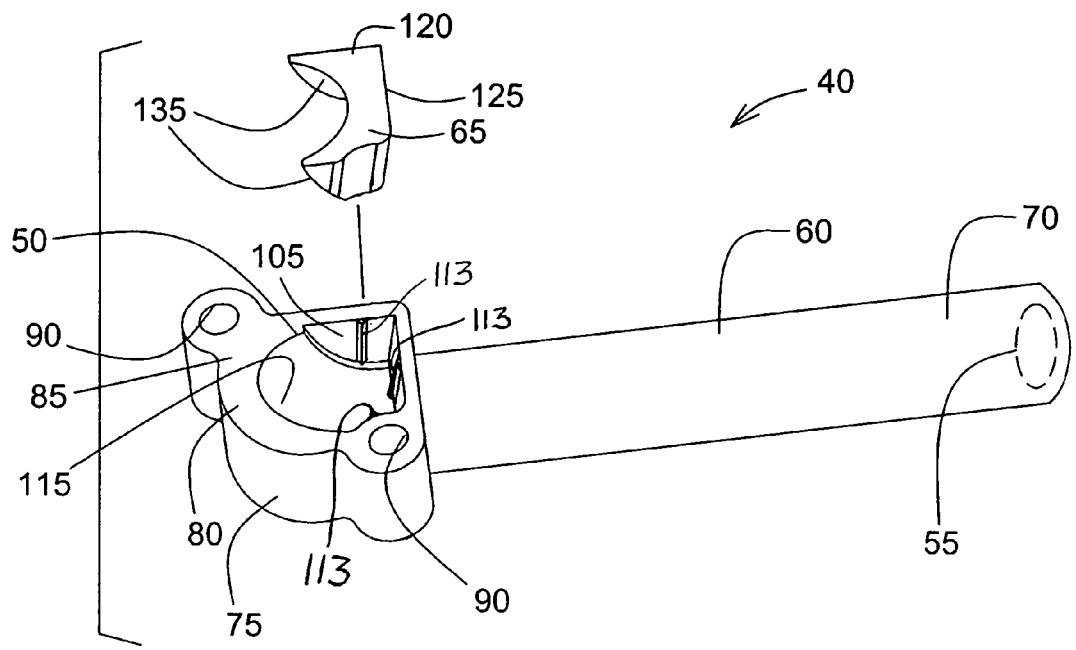
FIG. 11 is an exploded perspective view of a crossover tube including crush ribs formed as part of the conduit portion.
Figure 10:
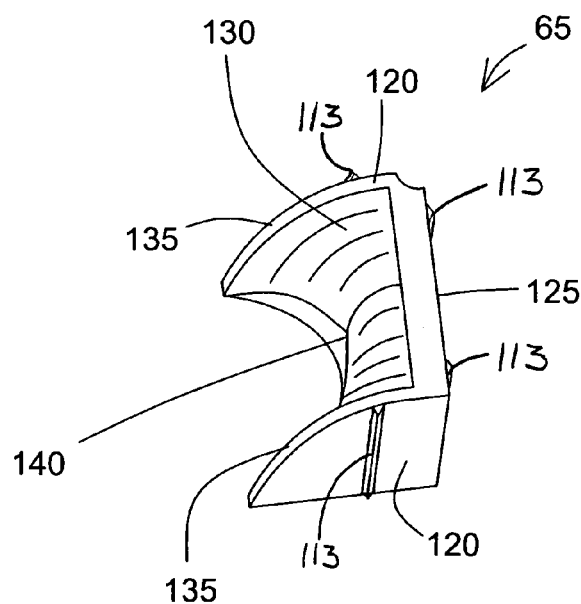
FIG. 10 is a perspective view of an insert including crush ribs.

In yet another construction, the insert 65 includes at least one "crush" rib 113 (shown in FIG. 10) that deforms when the insert 65 is inserted into the conduit portion 60. In another construction, illustrated in FIG. 11, the crush ribs 113 are formed as part of the conduit portion 60. As one of ordinary skill will realize, there are many ways of engaging the insert 65 with the conduit portion 60. As such, the invention should not be limited to the few examples presented herein.

As illustrated in FIGS. 4 and 8, the conduit 60 also defines an outer flow surface 115 of the ninety-degree bend. The outer flow surface 115 provides a portion of the smooth flow path 45 for the air/fuel mixture to follow. It should be noted that while a ninety-degree bend is shown and described herein, other angles can be achieved using the present invention. For example, forty-five degree bends can be formed using the conduit and insert arrangement described herein.

Figure 9:
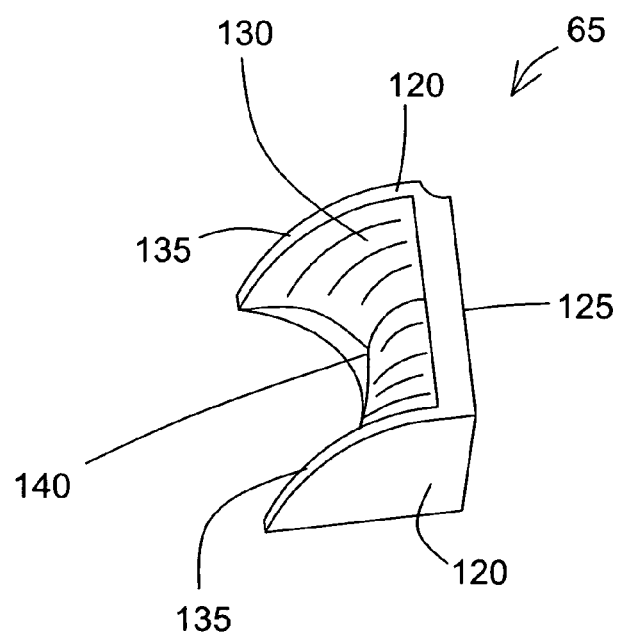
FIG. 9 is a bottom view of an insert.

With reference to FIGS. 4, 8, and 9, the insert 65 is more fully illustrated. The insert 65 includes two side surfaces 120 that engage the recessed surfaces 105 and a rear surface 125 that acts to properly orient the insert 65. The insert 65 also includes a bottom surface 130 that is curved to define a portion of the flow path 45.

The two side surfaces 120 are contoured to match the contour of the outlet opening 100 in the outlet end 75 of the conduit 60. As such, the side surfaces 120 may be flat or contoured to achieve the desired fit. While the actual shape of the side surfaces 120 is not important so long as an adequate fit between the conduit 60 and the insert 65 can be achieved, the use of a slight contour (i.e., non-planar side surface) can aid in the assembly of the tube 40. With non-planar side surfaces, the insert 65 can only be placed in the conduit 60 in one orientation, thus assuring proper assembly. One edge 135 of each side surface 120 is curved to match the curve of the recessed surfaces 105 within the conduit 60. The curved edges 135 cooperate with the rear surface 125 to properly position the insert 65 in both the axial direction as well as the direction normal to the outlet opening 100.

The bottom surface 130 of the insert 65 cooperates with the outer flow surface 115 of the conduit 60 to define the ninety-degree bend in the flow path 45. The bottom surface 130 defines an inner flow surface 140 of the bend when it is properly positioned within the outlet opening 100 of the conduit 60.

Thus, when assembled, the conduit 60 and insert 65 cooperate to define the complete flow path 45 having a substantially circular cross-section (taken normal to a central axis 1-1 of the flow path 45) at any point along the flow path 45. As shown in FIG. 8, the insert 65 and the conduit portion 60 cooperate to define the desired smooth flow path 45.

Figure 7:
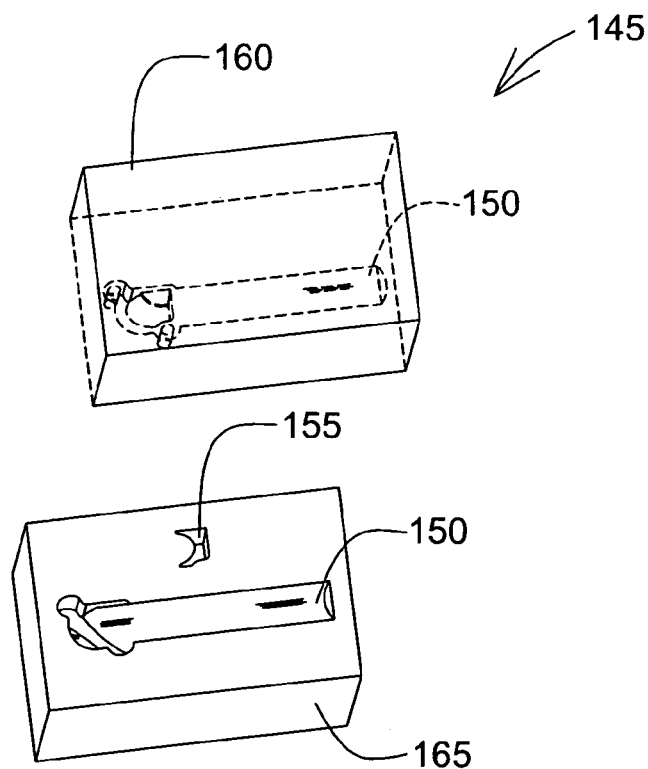
FIG. 7 is a perspective exploded view of a mold suited to the manufacture of the intake crossover tube of FIG. 3.

To manufacture the intake crossover tube 40, a family mold 145 is preferred. A separate mold for each of the tube 40 and the insert 65 could also be employed if desired. The family mold 145, illustrated in FIG. 7 includes a first space 150, or cavity for the conduit portion 60 and a second space 155, or cavity for the insert 65. Thus, the two components 60, 65 are made simultaneously, and out of the same material. In some constructions, multiple spaces 150, 155 are provided to allow for the manufacture of several components simultaneously.

In most constructions, a thermosetting plastic (e.g., polyester) is employed. However, other constructions may employ other materials (e.g., cast iron, steel, ceramics, composites, and the like). The mold 145 includes an upper half 160 and a lower half 165 that come together to define the two spaces 150, 155. The spaces 150, 155 are filled with the desired material to form the components 60, 65. In the case of the conduit 60, a core can be used to define the straight portion of the flow path 45 and outlet opening 100. Alternatively, the flow path 45 and outlet opening 100 can be machined into the part in a subsequent manufacturing step. Once the two components 60, 65 are formed, the insert 65 is positioned within the outlet opening 100 of the conduit 60 and may be glued, attached with a fastener 110, attached with a gasket 92 and screws, or otherwise attached to the conduit 60, thus completing the tube 40.

In operation, the carburetor 25 mixes fuel and air in the desired ratio to produce an air/fuel mixture. The air/fuel mixture flows out of the carburetor 25 and into the inlet 55 of the intake crossover tube 40. From the inlet 55, the air/fuel mixture travels through the conduit portion 60 and then around the bend. From the bend, the air/fuel mixture passes through the tube outlet 50 to the cylinder 30 where it is combusted. Generally, an intake port and a valve are disposed between the tube outlet 50 and the cylinder 30.

While an intake crossover tube 40 has been described in detail, there are many other uses for a tube constructed as described herein. For example, a tube that directs air from an air cleaner to a carburetor could be manufactured as described herein. Furthermore, a tube as described herein could be used to provide one or more coolant flow paths for a water-cooled or liquid-cooled engine. As such, the invention should not be limited to use as an intake crossover tube 40 alone. A tube manufactured as described herein is well suited to uses that involve moving a fluid from an inlet, through a bend to an outlet. The tube is particularly well suited to applications that involve moving a fluid from an inlet, through a bend to an outlet in which one or both of the inlet and the outlet are positioned in an elevated temperature environment (e.g., greater than 150° F.).

The invention provides a smooth flow passageway to improve flow efficiency. The invention also enables such smooth passageways to be made using thermoset plastics, even though it is usually difficult to make such injection-molded passageways out of thermosets due to problems using rotating, or multi-piece cores.

Although the invention has been described in detail with reference to certain preferred embodiments, variations and modifications exist within the scope and spirit of the invention as described and defined in the following claims.

What is claimed is:

1. A tube configured to attach to an engine housing and to guide a fluid from an inlet to an outlet, the tube comprising:
    a first component including an interior and a bend portion, the bend portion having a curved outer bend surface adjacent the interior and having a first inner bend surface adjacent the interior, the first inner bend surface including a first portion and a second portion that meet to define an edge positioned opposite the outer bend surface and spaced away from the inlet and the outlet; and
    a second component positioned adjacent the edge and including a curved surface that cooperates with the first portion and the curved outer bend surface to guide all of the fluid flow through the bend portion, wherein the second portion includes a substantially planar surface.

2. The tube of claim 1, wherein the tube has a flow path between an inlet and an outlet that is substantially circular in a cross-section taken normal to the flow path at the bend portion.

3. The tube of claim 1, wherein the second component is disposed completely within the first component.

4. The tube of claim 1, wherein the tube at least partially defines an intake passage for an internal combustion engine.

5. The tube of claim 1, wherein the first component and the second component are made from the same material.

6. The tube of claim 5, wherein the material includes thermosetting plastic.

7. The tube of claim 1, wherein the first component at least partially defines a flange.

8. The tube of claim 1, wherein the first component defines a portion of an outlet aperture and the second component defines the remainder of the outlet aperture, the outlet aperture being substantially circular.

9. The tube of claim 1, wherein the first component and the second component redirect the flow at the bend portion through an angle of about 90 degrees.

10. The tube of claim 1, wherein the curved surface covers the second portion.

11. A tube configured to attach to an engine housing and to guide a fluid along a tube interior from an inlet to an outlet, the tube including a bend portion that has a curved outer bend surface adjacent the interior and a curved inner bend surface adjacent the interior, the tube comprising:
   a first component that defines the outer bend surface and an edge opposite the outer bend surface, spaced away from the inlet and the outlet, and adjacent the interior; and
   a second component positioned adjacent the edge and including a curved surface that at least partially defines the curved inner bend surface, the curved surface arranged such that all of the fluid passes between the curved surface and the curved outer bend surface, wherein the curved inner bend surface includes a first portion and a second portion that intersect to define the edge, and wherein the second portion includes a substantially planar surface.

12. The tube of claim 11, wherein the tube has a flow path between an inlet and an outlet that is substantially circular in a cross-section taken normal to the flow path at the bend portion.

13. The tube of claim 11, wherein the second component is disposed completely within the first component.

14. The tube of claim 11, wherein the tube at least partially defines an intake passage for an internal combustion engine.

15. The tube of claim 11, wherein the first component and the second component are made from the same material.

16. The tube of claim 15, wherein the material includes thermosetting plastic.

17. The tube of claim 11, wherein the first component at least partially defines a flange.

18. The tube of claim 11, wherein the first component defines a portion of an outlet aperture and the second component defines the remainder of the outlet aperture, the outlet aperture being substantially circular.

19. The tube of claim 11, wherein the first component and the second component redirect the flow at the bend portion through an angle of about 90 degrees.

20. The tube of claim 11, wherein the curved surface covers the second portion.

21. A tube configured to attach to an engine housing and to guide a fluid from an inlet to an outlet, the tube comprising:
   a first component including an interior and a bend portion, the bend portion having a curved outer bend surface adjacent the interior and having a first inner bend surface adjacent the interior, the first inner bend surface including a first portion and a second portion that cooperate to define a sharp corner opposite the outer bend surface and spaced away from the inlet and the outlet; and
   a second component positioned adjacent the sharp corner and including a curved surface that has a second inner bend surface, the second inner bend surface and the outer bend surface cooperating to guide all of the fluid flow through the bend portion, wherein the second component is disposed completely within the first component, wherein the second portion includes a substantially planar surface.

22. The tube of claim 21, wherein the curved surface covers the second portion.

23. The tube of claim 21, wherein the second component is disposed completely within the first component.

24. The tube of claim 21, wherein the first component defines a portion of an outlet aperture and the second component defines the remainder of the outlet aperture.

* * * * *